United States Patent
Fletcher et al.

(10) Patent No.: US 6,729,854 B2
(45) Date of Patent: *May 4, 2004

(54) HYDRAULIC PUMP MANIFOLD

(75) Inventors: Peter C. Fletcher, Fort Worth, TX (US); Robin L. Newlon, Clarkston, MI (US); Craig R. Solgan, Rochester Hills, MI (US)

(73) Assignee: CRS Services, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/373,948

(22) Filed: Feb. 25, 2003

(65) Prior Publication Data

US 2003/0143085 A1 Jul. 31, 2003

Related U.S. Application Data

(63) Continuation of application No. 10/048,387, filed as application No. PCT/US00/20727 on Jul. 28, 2000, now Pat. No. 6,568,919.
(60) Provisional application No. 60/177,886, filed on Jan. 24, 2000, and provisional application No. 60/146,464, filed on Jul. 30, 1999.

(51) Int. Cl.$^7$ ................................................. F04B 49/00
(52) U.S. Cl. ..................... 417/307; 417/313; 137/884
(58) Field of Search ................... 417/307, 313; 137/884; 60/454, 468

(56) References Cited

U.S. PATENT DOCUMENTS

| | | | |
|---|---|---|---|
| 3,363,574 A | 1/1968 | Aldinger | 417/293 |
| 3,550,621 A | 12/1970 | Lansky | 137/608 |
| 3,589,387 A | 6/1971 | Raymond | 137/269 |
| 3,680,589 A | 8/1972 | Jeans et al. | 137/608 |
| 3,793,831 A * | 2/1974 | Khatti | 60/471 |
| 3,842,714 A * | 10/1974 | Coleman | 91/459 |
| 4,011,887 A | 3/1977 | Raymond | 137/608 |
| 4,170,113 A | 10/1979 | Kittle et al. | 60/427 |
| 4,170,214 A | 10/1979 | Gill et al. | 137/269 |
| 4,388,050 A | 6/1983 | Schuller | 417/539 |
| 4,856,560 A | 8/1989 | Neff et al. | 137/884 |
| 5,170,692 A | 12/1992 | Lonnemo | 91/461 |
| 5,542,450 A | 8/1996 | King et al. | 137/614.2 |
| 5,558,503 A | 9/1996 | Weller | 417/307 |
| 5,673,557 A | 10/1997 | Yoshida et al. | 60/421 |
| 5,709,247 A | 1/1998 | Hutton | 137/884 |
| 5,725,024 A | 3/1998 | Nimberger | 137/597 |
| 5,915,409 A | 6/1999 | Kaneko et al. | 137/270 |
| 6,116,868 A | 9/2000 | Lu | 417/440 |
| 6,314,997 B1 * | 11/2001 | Yamashita | 137/596.13 |
| 6,330,799 B1 | 12/2001 | Chatterjea | 60/456 |
| 6,568,919 B1 * | 5/2003 | Fletcher et al. | 417/307 |

\* cited by examiner

*Primary Examiner*—Charles G. Freay
(74) *Attorney, Agent, or Firm*—Gifford, Krass, Groh, Sprinkle, Anderson & Citkowski, P.C.

(57) ABSTRACT

A manifold for a hydraulic system including a pump and accessories such as valves and filters as well as gauges in which the manifold is made part of the pump in fluid communication with the output to receive hydraulic fluid and deliver it to selected accessories and to return the fluid to the reservoir of the hydraulic system all with a minimum of hoses and couplings.

7 Claims, 6 Drawing Sheets

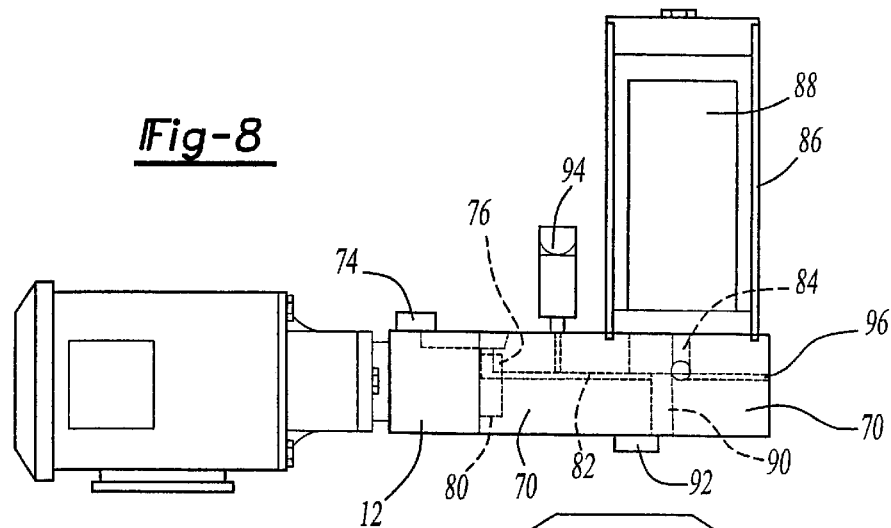
Fig-8
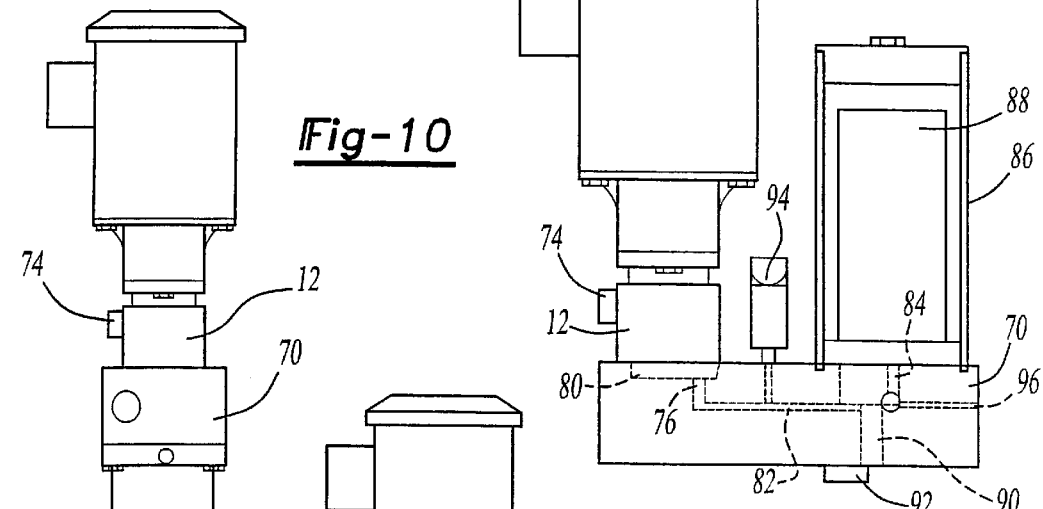
Fig-10
Fig-9
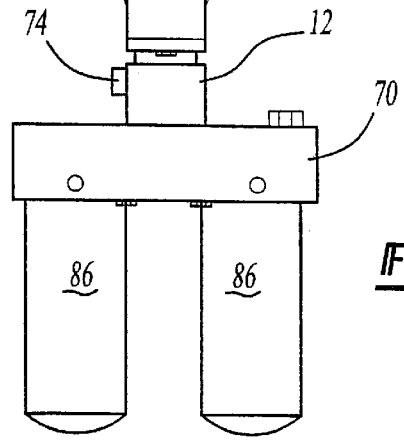
Fig-11

HYDRAULIC PUMP MANIFOLD

This application claims the benefit of U.S. application Ser. No. 10/048,387, filed Apr. 17, 2002, which is the U.S. National Phase Application of PCT Application No. PCT/US00/20727, filed Jul. 28, 2000, which claims priority on U.S. Provisional Application No. 60/177,886 filed Jan. 24, 2000 and U.S. Provisional Application Ser. No. 60/146,464, filed Jul. 30, 1999.

FIELD OF THE INVENTION

This invention relates to hydraulic fluid systems and particularly to hydraulic pump manifolds used in such systems.

BACKGROUND OF THE INVENTION

In a typical hydraulic system, a hydraulic pump delivers hydraulic fluid under pressure to a hydraulic actuator through a circuit in which a variety of accessories are used such as valves of different types, filters and gauges. A basic system usually includes at least a directional control valve and a pressure relief valve. Even a basic system requires a plurality of hydraulic hoses or lines and connections, which results in a loss of energy as the fluid passes through the hoses and connections. Such circuits require space and are labor intensive to assemble. Also, the hoses and connections expose the system to leaks and often occupy valuable space. To solve this problem, a hydraulic pump manifold has been invented which eliminates many of the hydraulic lines and connections of currently known hydraulic circuits and results in the rapid assembly of a compact circuit which can be easily modified by the substitution of components such as directional control valves, filter elements and pressure relief valves.

OBJECT OF THE INVENTION

It is an object of the invention to provide a manifold for use with a variety of hydraulic pumps in which the manifold is made part of the fluid output end of the pump for direct fluid communication for distribution of fluid under pressure to a variety of accessories such as valves, filters, gauges and actuators without or with a minimum need of hoses or couplings.

SUMMARY OF THE INVENTION

A manifold for use in hydraulic systems for direct coupling to the output of a hydraulic pump and adapted to support a variety of accessories and hydraulic components such as directional valves, filters, pressure relief valves and other valves as well as actuators and gauges, all without the need for hoses and fittings.

BRIEF DESCRIPTION OF THE DRAWINGS

FIG. 8 is an elevational view of the first alternative embodiment of the invention attached to the output end of a hydraulic pump and used in association with the filter element; and FIGS. 9, 10 and 11 are variations of the embodiment seen in FIGS. 1A and 8 showing the hydraulic pump and filter element in various positions relative to the manifold embodying the invention.

DETAILED DESCRIPTION OF THE DRAWINGS

Figure 1:
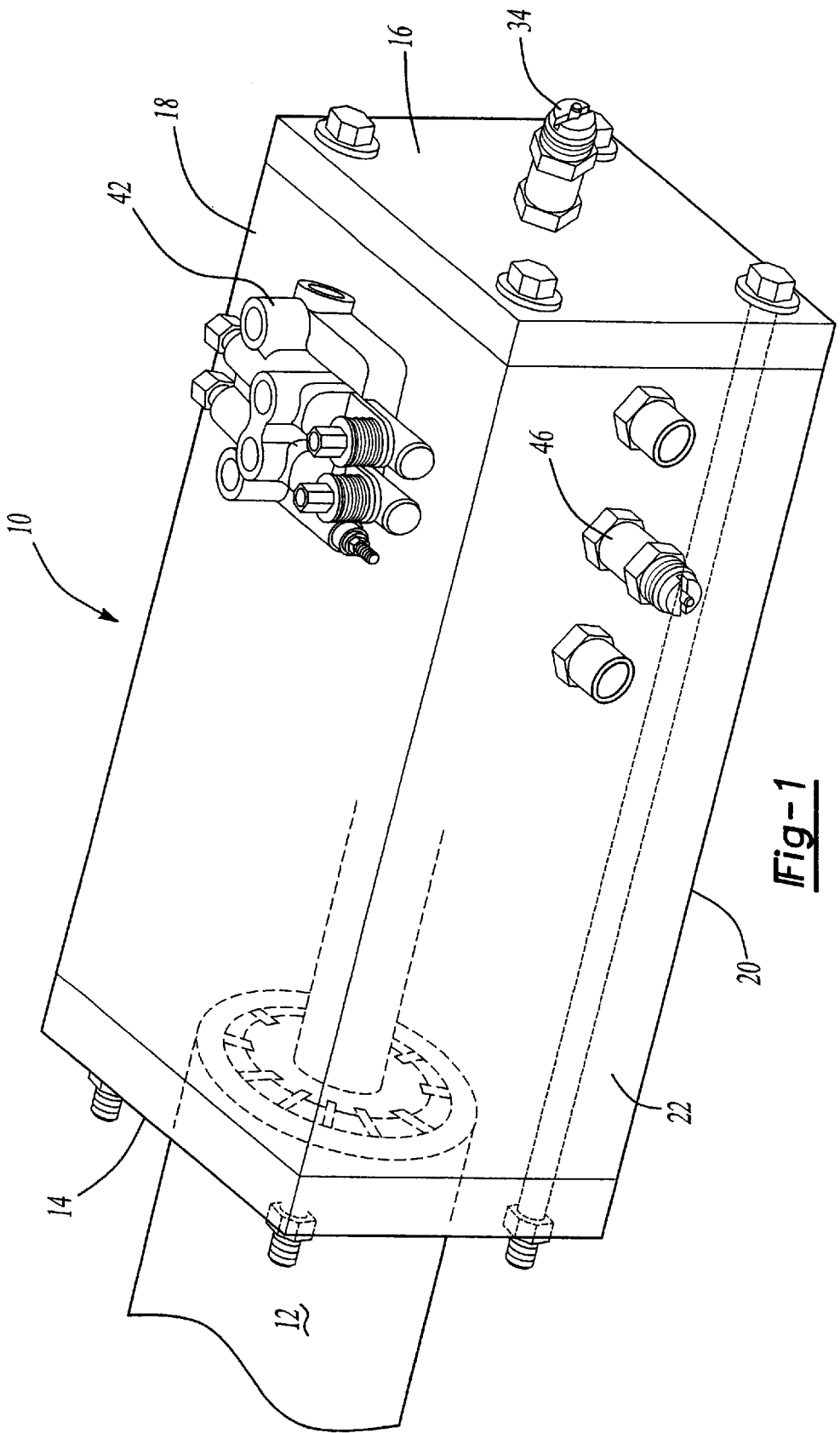
FIG. 1 is a perspective view of a preferred embodiment of a manifold made part of the output end of a hydraulic pump embodying the invention.
Figure 1A:
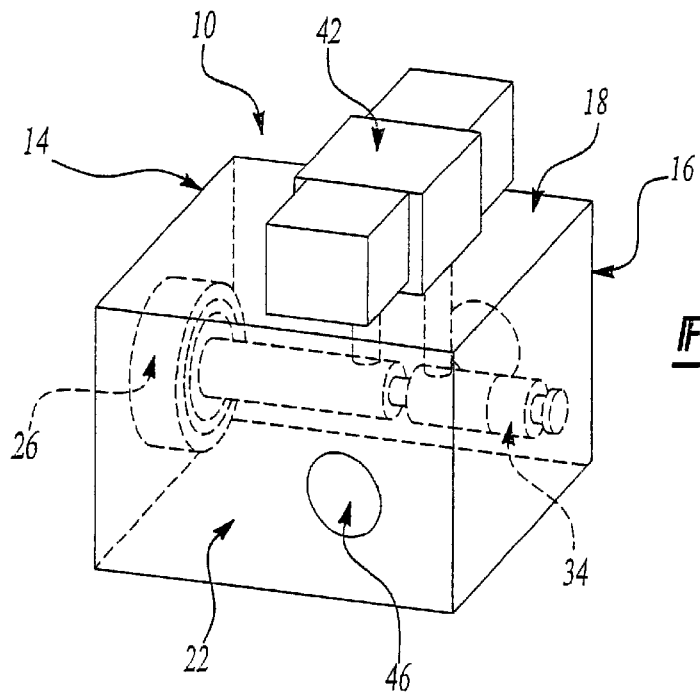
FIGS. 1A and 1B are perspective views of alternative embodiments.

The manifold embodying the invention is designated generally at 10 and is shown in FIG. 1 as part of the output end of a hydraulic pump 12 after its usual faceplate has been removed.

The manifold 10 consists of a single rectilinear front face 14, a back 16, a top 18, a bottom 20 and opposed side faces 22 and 24.

Figure 3:
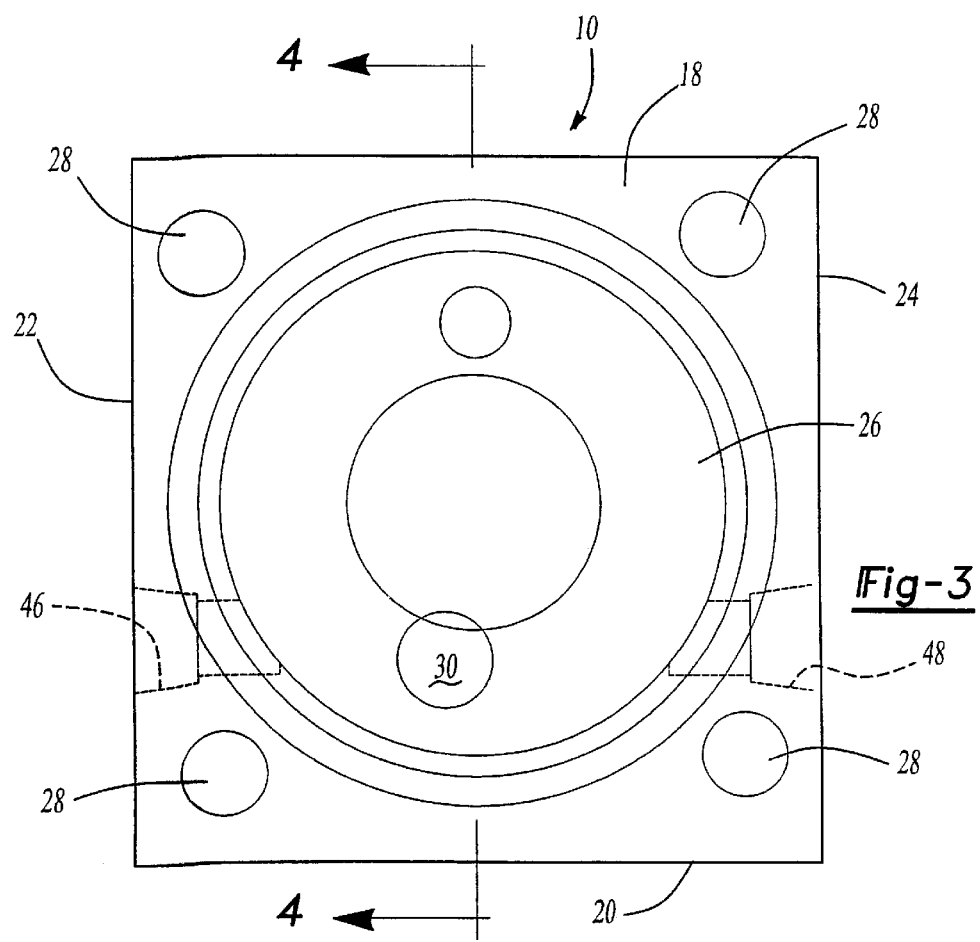
FIG. 3 is an elevation of the front face of the manifold in FIG. 2.
Figure 4:
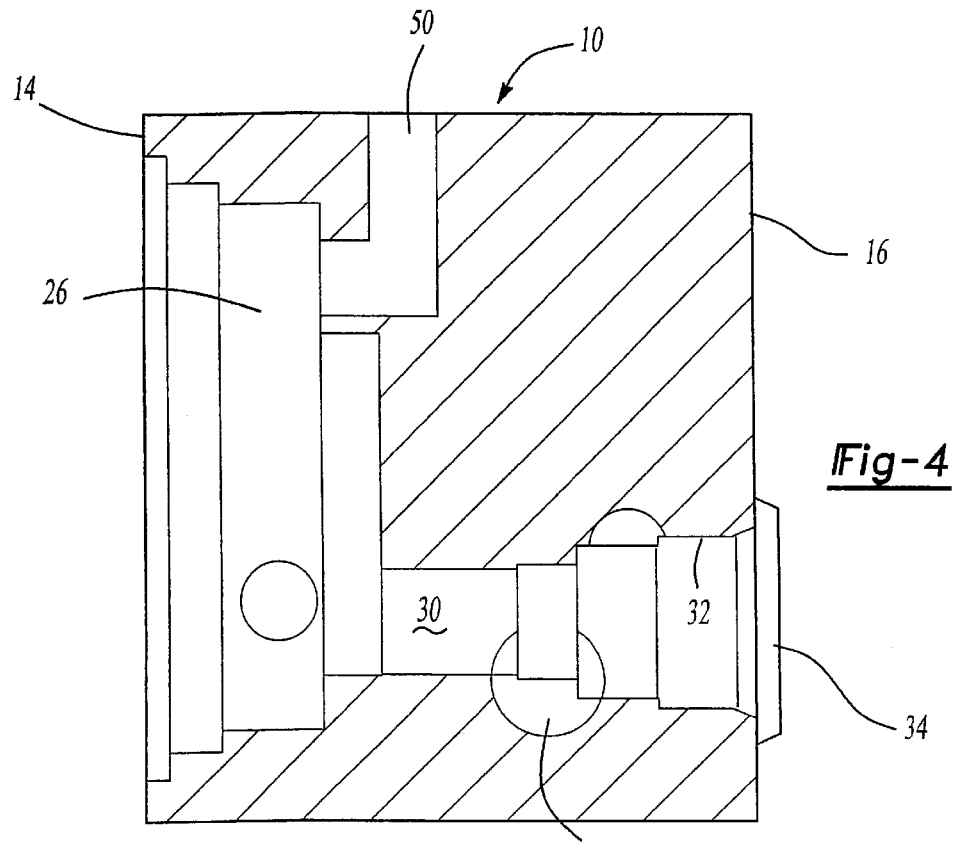
FIG. 4 is a bottom view of the manifold in the prior figures.

The front face 14 of manifold 10 seen in FIG. 3 has a cavity 26 for receiving the outflow end of the pump 12 and is provided with boltholes 28 for attachment of the manifold 10 to the pump 12 after the usual cover plate on the pump has been replaced by the manifold. The manifold 10 may be used with a variety of hydraulic pumps such as vane, rotor, gear and piston types.

The cavity 26 is in direct fluid communication with the outflow of pump 12 and opens to a passage 30 extending laterally from cavity chamber 26 to an aperture in the form of a stepped mounting bore 32 opening into the back face 16 of the manifold 10. Bore 32 is formed to accept a pressure relief valve 34 which is operable to open and close a return passage 36 seen in FIGS. 5 and 6 which extends to a port return 38 formed in the bottom face 20 of manifold 10. The port 38 is adapted for connection to a tank or reservoir 40 of the hydraulic circuit, shown in FIG. 7. The tank 40 also can be supported on the manifold 10.

Figure 7:
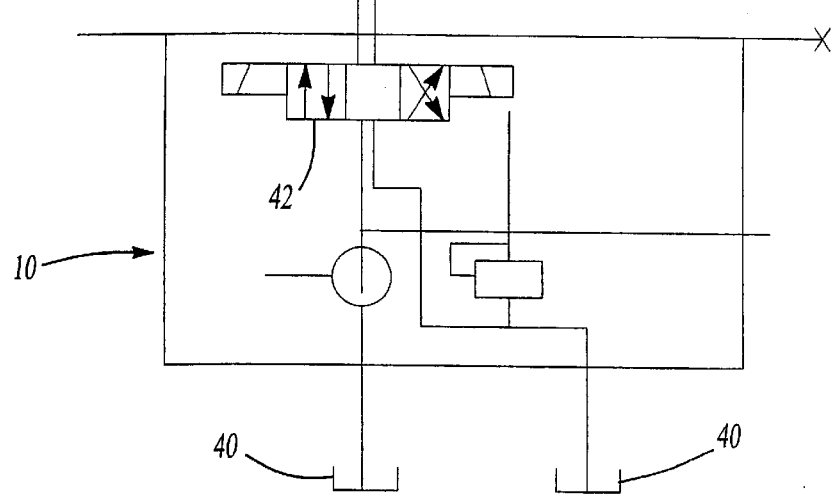
FIG. 7 is a schematic view of a hydraulic circuit employing the manifold of the present invention.

A directional valve 42 is mounted on the top face 18 for controlling the delivery of hydraulic supply pressure to an actuator 44 seen in FIG. 7. Valve 42 may be of any type and may provide either full supply pressure or proportional pressure depending upon the application. Such valves can be mounted on the top face 18 of manifold 10 by boltholes indicated at 35. Such mounting holes can be in an identical pattern for a variety of valves. Fluid is delivered to the actuator 44 through ports 46 and 48 formed in opposite side faces 22 and 24, respectively.

Figure 2:
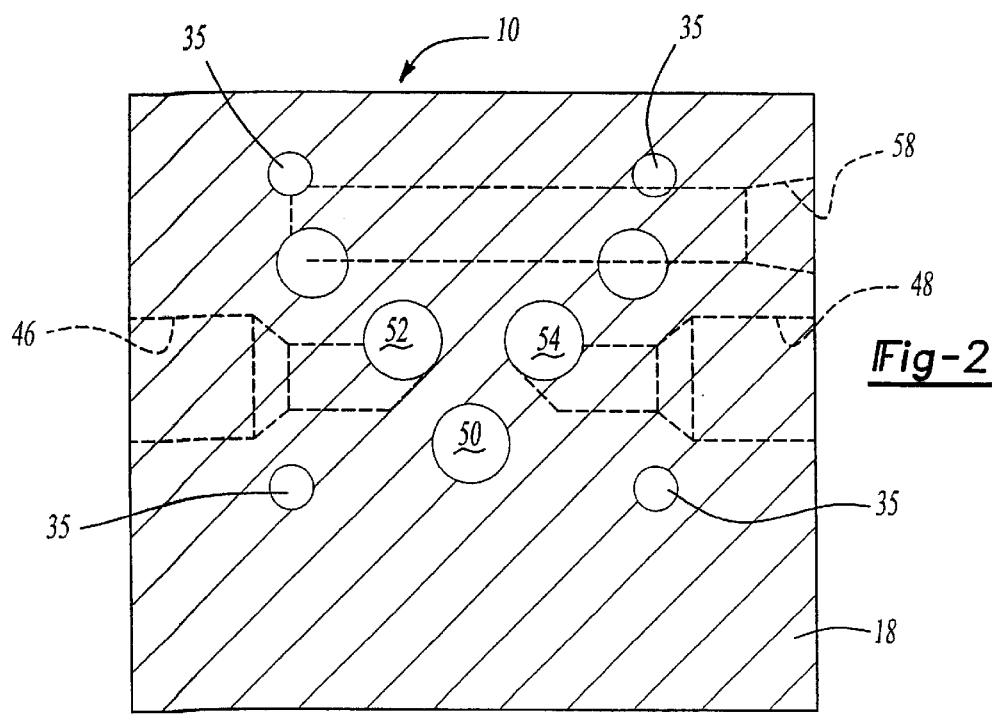
FIG. 2 is a top view of the manifold in FIG. 1 separate from other attachments.
Figure 5:
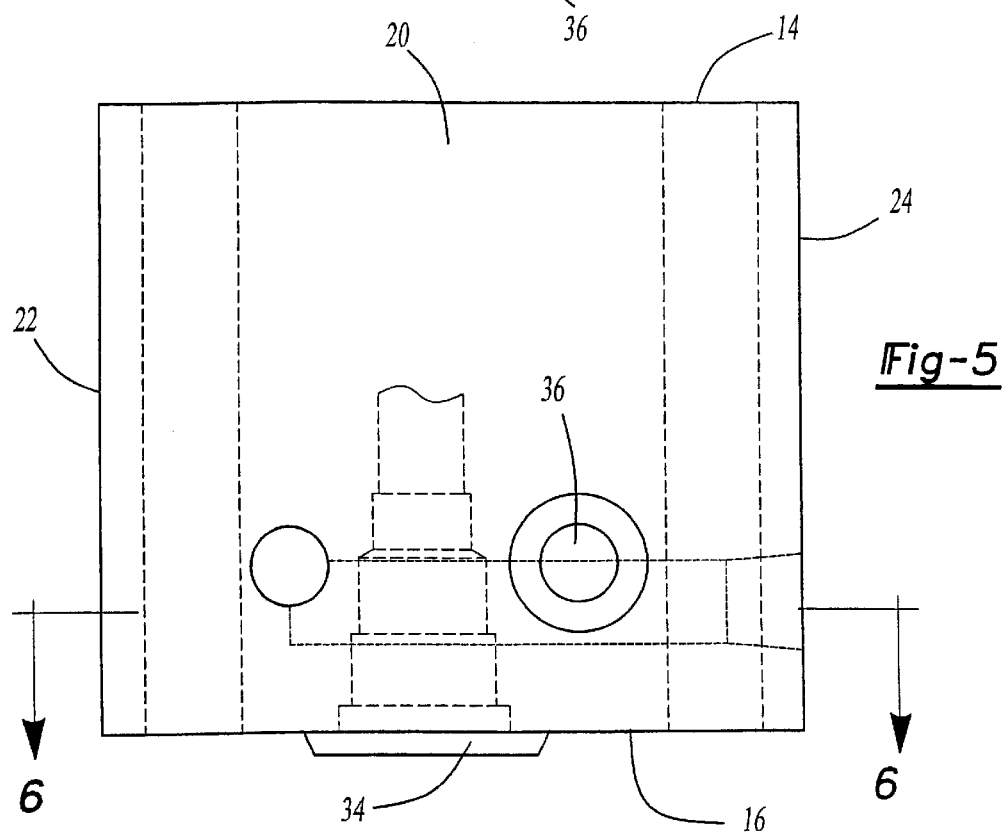
FIG. 5 is a cross-sectional view taken on line 5—5 in FIG. 3.
Figure 6:
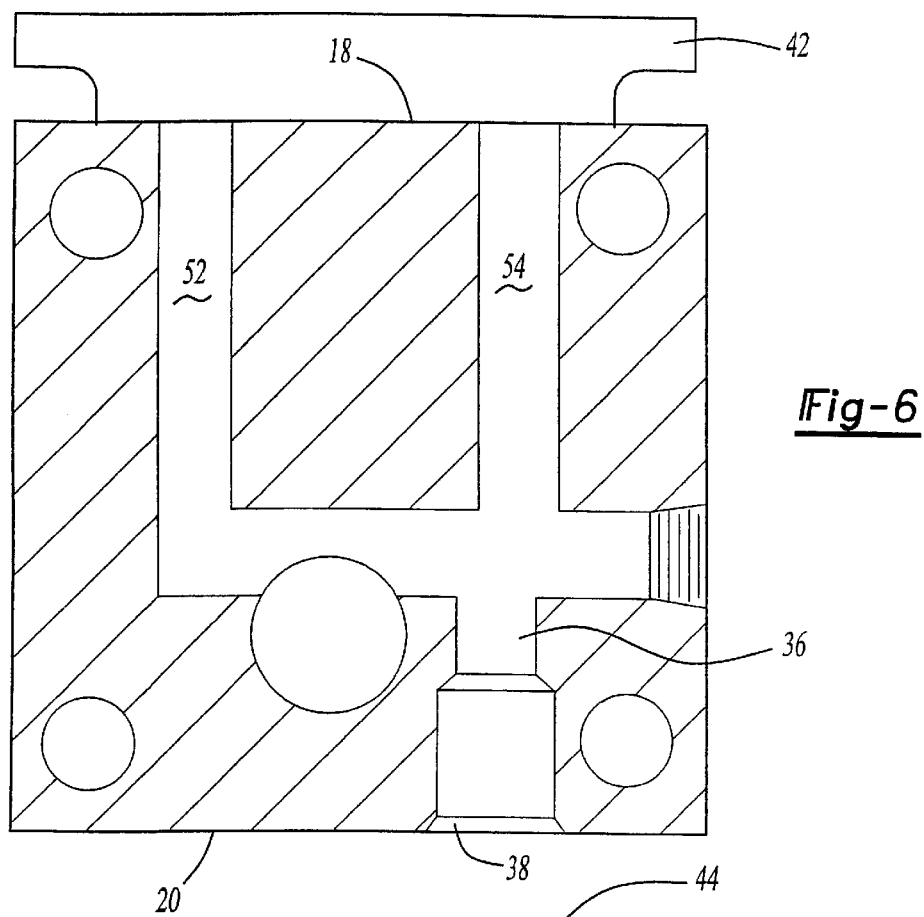
FIG. 6 is a cross-sectional view taken on line 6—6 in FIG. 4.

Valve 42 receives fluid flow from a passage 50, which extends upwardly from the main chamber 26 as viewed in FIG. 5. A pair of passages 52 and 54 are formed adjacent to passage 50 and extend downwardly from the top face 18 of manifold 10 to the output ports 46 and 48 located in opposed faces 22 and 24 of the manifold to deliver supplied pressure from the directional valve 42. As seen in FIG. 2, a passage 56 extends transversely of the manifold 10 to a port 58 for receiving a selected pressure gauge.

Figure 1B:
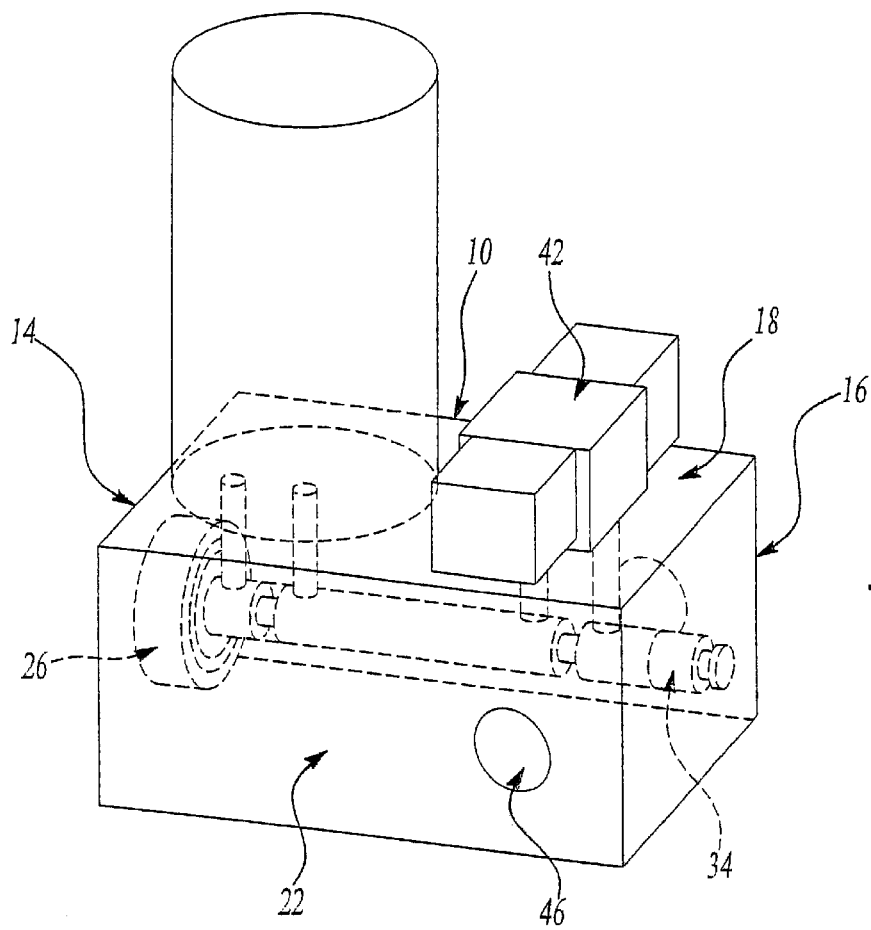

In a first alternative embodiment of the invention seen in FIG. 1B and FIG. 8, a modular filtration system includes a manifold 70, which is made part of a hydraulic pump 12 driven by an electric motor 72. The pump 12 has an inlet 74 for receiving fluid from a reservoir or tank and delivering pressurized fluid through the manifold portion of the pump so that a manifold cavity 80 similar to cavity 26 is in communication with the output of the pump 12. The manifold 70 has a filter inlet passage 82, which extends from the cavity 80 longitudinally of the manifold 70 and extends from the cavity 80 to the inlet of the filter. A conventional filter housing 86 for a filter element 88 is mounted to the top of the manifold 70. The filter outlet passage 84 extends from the outlet flow passage through the filter element to the filter housing 86. The filter housing 86 is mounted directly on a manifold in accordance with standard industrial mounting conventions and will accommodate most common industrial filter elements including spin-on types. Where applicable, the housing 86 has a cap or bowl permitting quick insertion and removal of the filter element 88.

A filter output passage 90 extends from the filter housing 86 back to the outlet flow passage 84 downstream of a by-pass check valve 92. A bore is formed in one of the sides or bottom of the manifold to position by-pass check valve 92 between the filter inlet flow passage 82 and the filter outlet flow passage 84 to permit adequate flow through the by-pass check valve from the filter inlet passage 82 through the filter bypass area 90 and out to passage 84. At a preset pressure, the by-pass check valve will divert filter inlet flow directly to a manifold outlet 96 effectively by-passing the filter unit 86 should the filter element 88 become clogged. Additionally, a variety of filter clogging indicators 94 (FIG. 8) such as standard glycerin filled gauges or electronic readout gauges can be mounted to multiple indicator access points on the manifold 70. Flow passages are formed between each indicator point and either the cavity pressure output or the filter pressure output for diagnostic test information. The manifold assembly permits a quick and easy assembly of a filter element and by-pass check valve, which are proper for the circuit. The by-pass check valve is selected in accordance with the filter elements so that it opens at a proper pressure build up when the filter is clogged. All threaded hydraulic connections are made with seals. The location of the filtration manifold 70 directly as part of the pump permits a leak free connection of the pump to the filter eliminating costly fittings and permitting a compact design. Filtration can be accomplished at any time during scheduled maintenance and production periods or after hours, because the primary hydraulic system does not need to be in operation.

FIG. 9 shows a second alternative embodiment of the invention in which the pump 12 and motor 72 are mounted to the top of the manifold, rather than the side as disclosed in connection with FIG. 8. This provides an opportunity for a piggyback type of arrangement. The manifold 70 in FIG. 9 differs from the manifold in FIG. 8 only in that the cavity 80 for housing the outflow end of the hydraulic pump 12 is located on the top face rather than the end face to provide a horizontally compact arrangement.

A third embodiment of the invention is shown in FIG. 10 in which the filter housing 86 is mounted to the bottom of the manifold 70 and the pump 12 is mounted to the top face. A dual filter arrangement is shown in FIG. 11 in which a pair of filter housings 86 are mounted on the bottom face of the manifold 70. All of the arrangements shown in FIGS. 8 through 11 are particularly useful as part of portable filtration units. Such units can be mounted to a handcart, directly to a reservoir via adapter plate, or other mobile unit and moved to the desired hydraulic system. The unit is connected to the hydraulic circuit to filter the hydraulic fluid in that circuit. Heavy-duty filters and pumps can be used to facilitate the rapid filtration of such systems. After the fluid is filtered the unit is disconnected from the system and ready for filtering still another hydraulic system or circuit.

A manifold arrangement has been provided which may be used with any type of hydraulic pump and a selected one of a variety of directional valves and/or filters to supply pressure directly to an actuator. The manifold results in a compact arrangement of these and other components of the hydraulic circuit such as filters, pressure relief valves, and pressure gauges and eliminates the requirement for multiple hoses, lines and couplings. The manifold may be attached directly to the pump for the purpose of filtering the hydraulic fluid of a hydraulic circuit without requiring that hydraulic circuit to be in operation or connected to an actuator

We claim:

1. A manifold for a hydraulic system having a pump having a pressurized fluid delivery portion, a pressure relief valve and at least one component from a group comprised of a filter and a fluid control valve, said manifold comprising:

a pump mounting portion having an inwardly extending cavity adapted to receive the pressurized fluid delivery portion of said pump;

a first component mounting portion for mounting said one of a filter and directional control valve;

an inlet passage communicating fluid from said cavity to said first component mounting surface;

a pair of fluid ports in the manifold;

a pair of passages, each of said pair of passages extending between said first component mounting portion and one of said pair of ports;

a return passage extending between said cavity and a return port;

an aperture formed in said manifold to receive said pressure relief valve to permit mounting of said pressure relief valve in the return passage.

2. The manifold of claim 1, wherein the component is a directional valve.

3. The manifold of claim 1, wherein the component is a filter.

4. The manifold of claim, 2, wherein the manifold further has a filter mounting portion fluidly connected to said inlet passage.

5. A manifold for a hydraulic system having a pump having a pressurized fluid delivery portion, a pressure relief valve and a filter, said manifold comprising:

a pump mounting portion having an inwardly extending cavity adapted to receive said pressurized fluid delivering portion of said pump;

a filter mounting portion for mounting said filter;

an inlet passage communicating fluid from said cavity to said filter mounting portion;

an outlet port;

an outlet passage extending from the filter mounting portion to the outlet port;

a return passage extending between said inlet passage and a return port;

an aperture formed in said manifold to receive said pressure relief valve, said aperture being positioned to operably position said pressure relief valve in the return passage.

6. The manifold of claim 5 further comprising a top surface having said pump mounting portion.

7. The manifold of claim 5 further comprising an end surface having said pump mounting portion.

\* \* \* \* \*